(12) United States Patent
Nadimpalli et al.

(10) Patent No.: US 11,110,940 B2
(45) Date of Patent: Sep. 7, 2021

(54) METHOD AND SYSTEM FOR GENERATING TOUCH-BASED ALERTS TO A DRIVER IN A VEHICLE

(71) Applicant: Wipro Limited, Bangalore (IN)

(72) Inventors: Vivek Kumar Varma Nadimpalli, Hyderabad (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 50 days.

(21) Appl. No.: 16/782,092

(22) Filed: Feb. 5, 2020

(65) Prior Publication Data

US 2021/0171056 A1 Jun. 10, 2021

(30) Foreign Application Priority Data

Dec. 6, 2019 (IN) .............................. 201941050385

(51) Int. Cl.
| | |
|---|---|
| *B60W 50/16* | (2020.01) |
| *G08B 6/00* | (2006.01) |
| *G08B 21/06* | (2006.01) |
| *G06K 9/00* | (2006.01) |
| *B60R 11/04* | (2006.01) |
| *B60Q 9/00* | (2006.01) |

(52) U.S. Cl.
CPC .............. *B60W 50/16* (2013.01); *B60Q 9/00* (2013.01); *B60R 11/04* (2013.01); *G06K 9/00255* (2013.01); *G06K 9/00281* (2013.01); *G06K 9/00892* (2013.01); *G08B 6/00* (2013.01); *G08B 21/06* (2013.01); *B60W 2540/229* (2020.02)

(58) Field of Classification Search
CPC ............ B60W 50/16; B60W 2540/229; G06K 9/00892; G06K 9/00255; G06K 9/00281; G08B 6/00; G08B 21/06; B60Q 9/00; B60R 11/04
USPC ........................................................ 340/439
See application file for complete search history.

(56) References Cited

U.S. PATENT DOCUMENTS

| | | | |
|---|---|---|---|
| 9,975,483 B1 * | 5/2018 | Ramaswamy | ........ B60W 40/08 |
| 10,339,771 B2 | 7/2019 | Bostick et al. | |
| 2017/0147871 A1 * | 5/2017 | Tseng | ...................... G06F 3/012 |
| 2018/0072327 A1 | 3/2018 | Seppelt et al. | |

(Continued)

FOREIGN PATENT DOCUMENTS

DE 102008064645 A1 4/2010

*Primary Examiner* — Omar Casillashernandez
(74) *Attorney, Agent, or Firm* — Finnegan, Henderson, Farabow, Garrett & Dunner, LLP

(57) ABSTRACT

A method and driver assistance system for generating touch-based alerts to a driver in a vehicle is disclosed. The driver assistance system receives frames including the driver in vehicle and detects position of face of the driver in plurality of frames. Facial attributes of the driver are identified based on position of the face and one or more eye attributes of the driver are determined based on the identified one or more facial attributes. Based on the facial attributes and the one or more eye attribute sensory information is estimated from a plurality of sensory data. Further, information regarding haptic sensation is computed for the driver based on estimated sensory information and a position of hands of the driver received from a hand tracking device. Thereafter, an alert is generated using signals relating to the haptic sensation to the driver for taking one or more corrective measure.

18 Claims, 5 Drawing Sheets

(56) References Cited

U.S. PATENT DOCUMENTS

2018/0215395 A1\* 8/2018 Keany ................ G06K 9/00221
2018/0257564 A1   9/2018 Kapuria et al.
2019/0375431 A1\* 12/2019 Garcia .................. B62D 1/046
2020/0238952 A1\* 7/2020 Lindsay ................. B60R 25/25

\* cited by examiner

METHOD AND SYSTEM FOR GENERATING TOUCH-BASED ALERTS TO A DRIVER IN A VEHICLE

TECHNICAL FIELD

The present subject matter is related in general to driver assistance and haptic based alert systems, more particularly, but not exclusively to method and system for generating touch-based alerts to a driver in a vehicle.

BACKGROUND

Vehicle safety system has become one of the focused areas in automobile industry. These systems include mechanism for alerting a driver to the environment around the vehicle. Recently, many safety systems have been added to automobiles which detect different kinds of events associated with the driver such as, drowsiness, driver distraction, over-speed and the like. Accordingly, whenever a set of events are generated, the safety systems may trigger an alert to the driver such that the driver is able to understand the event generated and react accordingly in real time.

In existing mechanism for alerts, if an event is generated, the system alerts the driver using audio or visual means. In audio based alert system, whenever an event is triggered, the driver is alerted by siren sounds, automated voices and the like. Likewise, in visual based alert system, if an event is triggered, the driver is alerted based on different warning lights displayed on dashboard of the vehicle. However, such audio and visual based alert system may not be effective in every scenarios. For example, if the driver is talking to the passengers in back seat, a driver distraction event is generated. In case of the visual based alert, the warning lights generated on the dashboard may not provide any alert as the driver is not seeing the dashboard. In another scenario with audio-based alert, a drowsy driver who is alerted by siren sound may not be able to listen to the sound and may not react to the siren. Also, frequent generation of audio alerts may disturb other passengers in the vehicle. Hence, the audio and visual based alert systems require a high degree of driver attention in every situation. In addition, effect of the audio and visual based alerts may cause nuisance to other passengers in the vehicle.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for generating touch-based alerts to a driver in a vehicle. The method comprises receiving a plurality of frames including the driver in the vehicle from an image capturing device configured in the vehicle and detecting a position of face of the driver in each of the plurality of frames using a pretrained position detection model. Further, one or more facial attributes of the driver are identified based on the position of the face using a pretrained feature extraction model. Based one on the identified one or more facial attributes, the method comprises determining or more eye attributes of the driver using a pretrained attribute determination model. Further, the method comprises estimating sensory information from a plurality of sensory data based on the one or more facial attributes and the one or more eye attributes using a pretrained event model. Information regarding haptic sensation for the driver is computed based on the estimated sensory information and a position of hands of the driver received from a hand tracking device configured in the vehicle. Thereafter, using signals relating to the haptic sensation received from a haptic device, the method comprises generating an alert to the driver for taking one or more corrective measure. The haptic device generates the signals based on the computed information regarding the haptic sensation.

In an embodiment, the present disclosure may relate to a driver assistance system for generating touch-based alerts to a driver in a vehicle. In some embodiments, the driver assistance system is connected to an image capturing device, a hand tracking device and a haptic device configured in the vehicle. The driver assistance system may comprise a processor and a memory communicatively coupled to the processor, where the memory stores processor executable instructions, which, on execution, may cause the driver assistance system to receive a plurality of frames including the driver in the vehicle from the image capturing device and detects a position of face of the driver in each of the plurality of frames using a pretrained position detection model. Further, the driver assistance system identifies one or more facial attributes of the driver based on the position of the face using a pretrained feature extraction model.

Based one on the identified one or more facial attributes, the driver assistance system determines one or more eye attributes of the driver using a pretrained attribute determination model. The driver assistance system estimates sensory information from a plurality of sensory data based on the one or more facial attributes and the one or more eye attributes using a pretrained event model. Further, information regarding haptic sensation for the driver is computed based on the estimated sensory information and a position of hands of the driver received from the hand tracking device. Thereafter, using signals relating to the haptic sensation received from the haptic device, the driver assistance system generates an alert to the driver for taking one or more corrective measure. The haptic device generates the signals based on the computed information regarding the haptic sensation.

In an embodiment, the present disclosure relates to a non-transitory computer readable medium including instructions stored thereon that when processed by at least one processor may cause a driver assistance system to receive a plurality of frames including the driver in the vehicle from the image capturing device and detect a position of face of the driver in each of the plurality of frames using a pretrained position detection model. Further, the instruction causes the processor to identify one or more facial attributes of the driver based on the position of the face using a pretrained feature extraction model. Based one on the identified one or more facial attributes, the instruction causes the processor to determine one or more eye attributes of the driver using a pretrained attribute determination model. The instruction causes the processor to estimate sensory information from a plurality of sensory data based on the one or more facial attributes and the one or more eye attributes using a pretrained event model. Further, information regarding haptic sensation for the driver is computed based on the estimated sensory information and a position of hands of the driver received from the hand tracking device. Thereafter, using signals relating to the haptic sensation received from the haptic device, the instruction causes the processor to generate an alert to the driver for taking one or more corrective measure. The haptic device generates the signals based on the computed information regarding the haptic sensation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
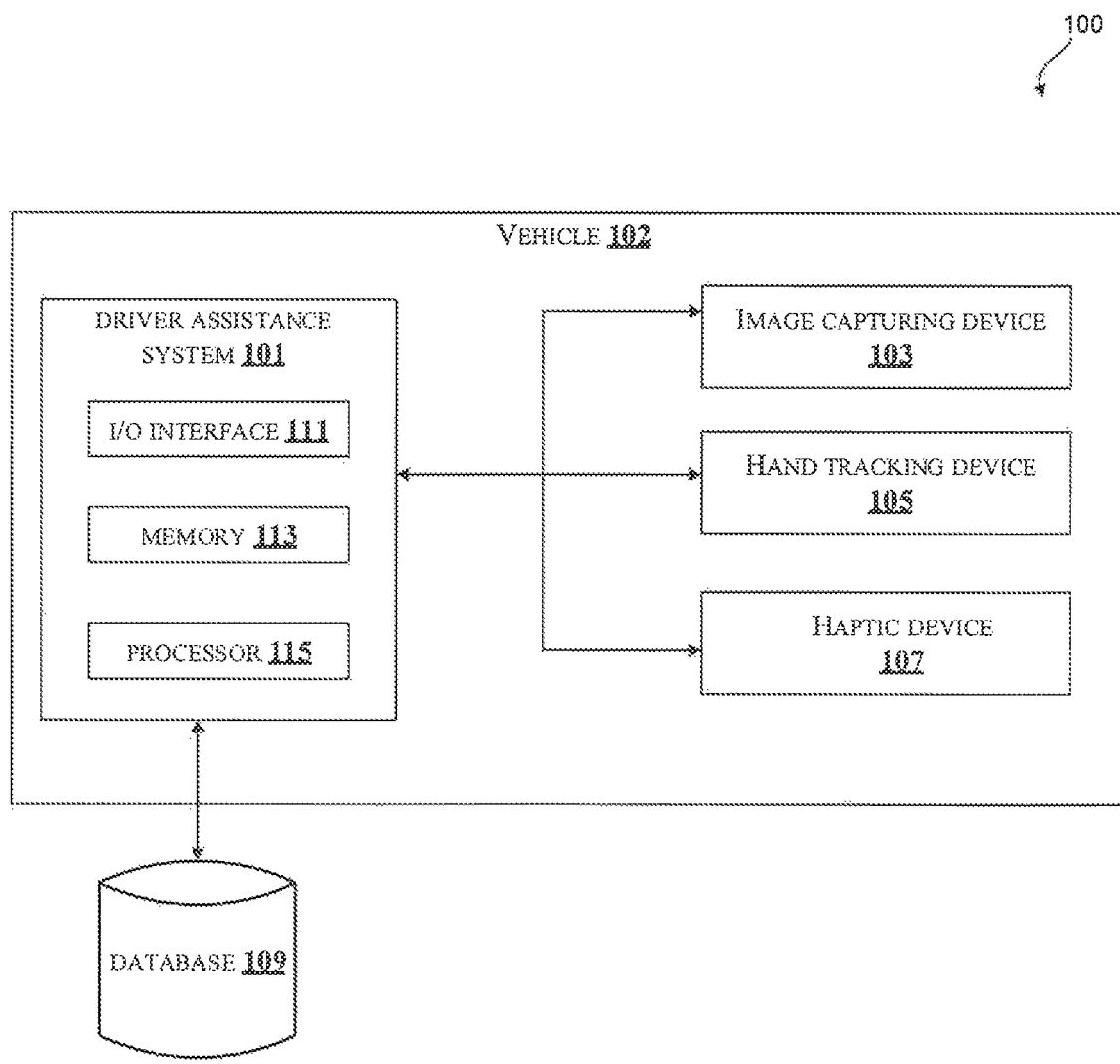
FIG. 1 illustrates an exemplary environment for generating touch-based alerts to a driver in a vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and driver assistance system for generating touch-based alerts to a driver in a vehicle. Existing scenarios may include audio and visual based systems for sending alerts to the driver in the vehicle. However, the audio and visual based system are prone to errors and require a high degree of attention of the driver in every situation. The present disclosure resolves this problem by providing touch-based alerts to the driver by using mid-air haptics technique. The present disclosure utilises facial and eye features of the driver while driving the vehicle to identify an associated threat. Accordingly, an alert is generated for the driver depending on a location of hands of the driver using haptic sensation generated by a haptic device based on the identified threat. Thus, the present disclosure provides an effective alert system for the driver, since haptic sensation can be experienced by the driver irrespective of direction driver is focusing and a state the driver. Further, the present disclosure involves minimum computation power for generating the haptic sensation.

FIG. 1 illustrates an exemplary environment for generating touch-based alerts to a driver in a vehicle in accordance with some embodiments of the present disclosure.

As shown in FIG. 1, an environment 100 includes a driver assistance system 101 configured in a vehicle 102 for generating touch-based alerts to a driver of the vehicle 102. In an embodiment, the driver assistance system 101 may be configured with an Electronic Control Unit (ECU) of the vehicle 102. The driver assistance system 101 is communicatively connected using communication network (not shown explicitly) to an image capturing device 103, a hand tracking device 105 and a haptic device 107 configured in the vehicle 102. In an embodiment, the communication network may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. Further, the driver assistance system 101 may be connected to a database 109. The database 109 may include training data and one or more pre-trained neural network models.

The image capturing device 103 may include, for example, cameras, video recorders and the like for capturing images within the vehicle 102. The hand tracking device 105 may be for example, a leap motion camera for detecting a position of hands of the driver in the vehicle 102. A person skilled in the art would understand that, any other devices, not mentioned explicitly, may also be used for tracking the hand position of the driver. The haptic device 107 are on-board device such as mid-air haptic device, in the vehicle 102 for assisting drivers in the vehicle 102. The haptic device 107 enables to provide touch/haptic sensations for alerting the driver in the vehicle 102. The driver assistance system 101 generates alert for the driver in the vehicle 102. Further, the driver assistance system 101 may include an I/O interface 111, a memory 113 and a processor 115. The I/O interface 111 may be configured to receive data from the image capturing device 103 and the hand tracking device 105. The data from the I/O interface 111 may be stored in the memory 113. The memory 113 may be communicatively coupled to the processor 115 of the driver assistance system 101. The memory 113 may also store processor instructions which may cause the processor 115 to execute the instructions for generating touch-based alerts to a driver in a vehicle.

The driver assistance system 101 may train a plurality of neural network models using historic images associated with the driver by machine learning techniques. In an embodiment, the plurality of network models may be stored in the database 109. Alternatively, the plurality of network models may be stored in the driver assistance system 101.

In real-time situation when the driver is driving the vehicle 102, the driver assistance system 101 may verify condition of the driver at every predefined time period. For instance, the predefined time period may be ten minutes. The driver assistance system 101 may receive a plurality of frames from the image capturing device 103. The plurality of frames may include a scene within the vehicle 102 including the driver. The driver assistance system 101 detects a position of face of the driver in each of the plurality of frames by using a pretrained position detection model. The position detection model is pre-trained using a plurality of training frames of the driver annotated with position of the face.

Once the position of the face is detected, the driver assistance system 101 may identify one or more facial attributes of the driver depending on the position of the face. The one or more facial attributes are identified by using a pretrained feature extraction model. The feature extraction model is explained in detailed in FIG. 2. The one or more facial attributes may include, geometrical features associated with face, face positions and orientations such as face turned left, right, up, down and the like. In an embodiment, the one or more facial attributes may be detected in a sequence of frames in order to identify context of the scene within the vehicle 102. The context of the scene may associated with attention of the driver. For instance, the context may indicate if the driver is attentive while driving or is turning to co-passenger and the like depending on the identified one or more facial attributes. Further, based on the one or more facial attributes, the driver assistance system 101 may determine one or more eye attributes of the driver using a pretrained attribute determination model. The attribute determination model is explained in detail in FIG. 2 below.

The one or more eye attributes may include, for example, number of times the driver closes and opens eyes in a predetermined time period, closed and opened eyelids and dilated and contracted pupil size of the driver. A person skilled in the art would understand that the one or more eye attributes may also include any other features which may indicate a state of the eyes of the driver. Particularly, the one or more eye attributes may be determined by detecting number of times eyes of the driver are closed or opened in a sequence of the plurality of frames. The detected number is compared with a threshold value to identify if the driver is sleepy or drowsy while driving the vehicle 102. In an embodiment, the threshold value may indicate a number for closing or opening the eyes in a sequence of frames, beyond which the driver may be identified as sleepy or drowsy.

In an embodiment, the threshold value may be eight sequence of frames. Consider, if in two consecutive frames, the eyes of the driver are closed and based on the comparison with the threshold value, the driver is identified to be not attentive. In such case, the one or more facial attributes and the one or more eye attributes are utilised to estimate sensory information using a pretrained event model (explained in detail in later Figures of present disclosure). In an embodiment, the sensory information may indicate regarding possibility of the threat and severity associated with the threat based on the one or more facial and eye attributes. The sensory information is estimated from sensory data which is predetermined and stored in the driver assistance system 101. Particularly, the sensory data include plurality of labels indicating presence or absence of a threat to the vehicle 102. In an embodiment, each label may include types of haptic sensation depending on the threat. For instance, haptic sensation for sleeping while driving may be different from turning and talking to co-passenger in the vehicle 102. Therefore, depending on the one or more facial attributes and eye attributes, the driver assistance system 101 determines the sensory information from the sensory data.

Once the sensory information is estimated, the driver assistance system 101 may retrieve/request position of hands of the driver from the hand tracking device 105 and compute information regarding haptic sensation for the driver based on the estimated sensory information and the position of hands of the driver. Thereafter, based on the information regarding the haptic sensation, the driver assistance system 101 may request the haptic device 107 for signals relating to the haptic sensation which are utilised to generate the alert to the driver for taking one or more corrective measure. In an embodiment, the signals may be transmitted to the driver as haptic sensation depending on the detected threat. The one or more corrective measures may include for example, stopping the vehicle 102 in case the driver is sleepy, or resume attention to driving in case the driver is turned towards passenger and engaged in communication.

Figure 2:
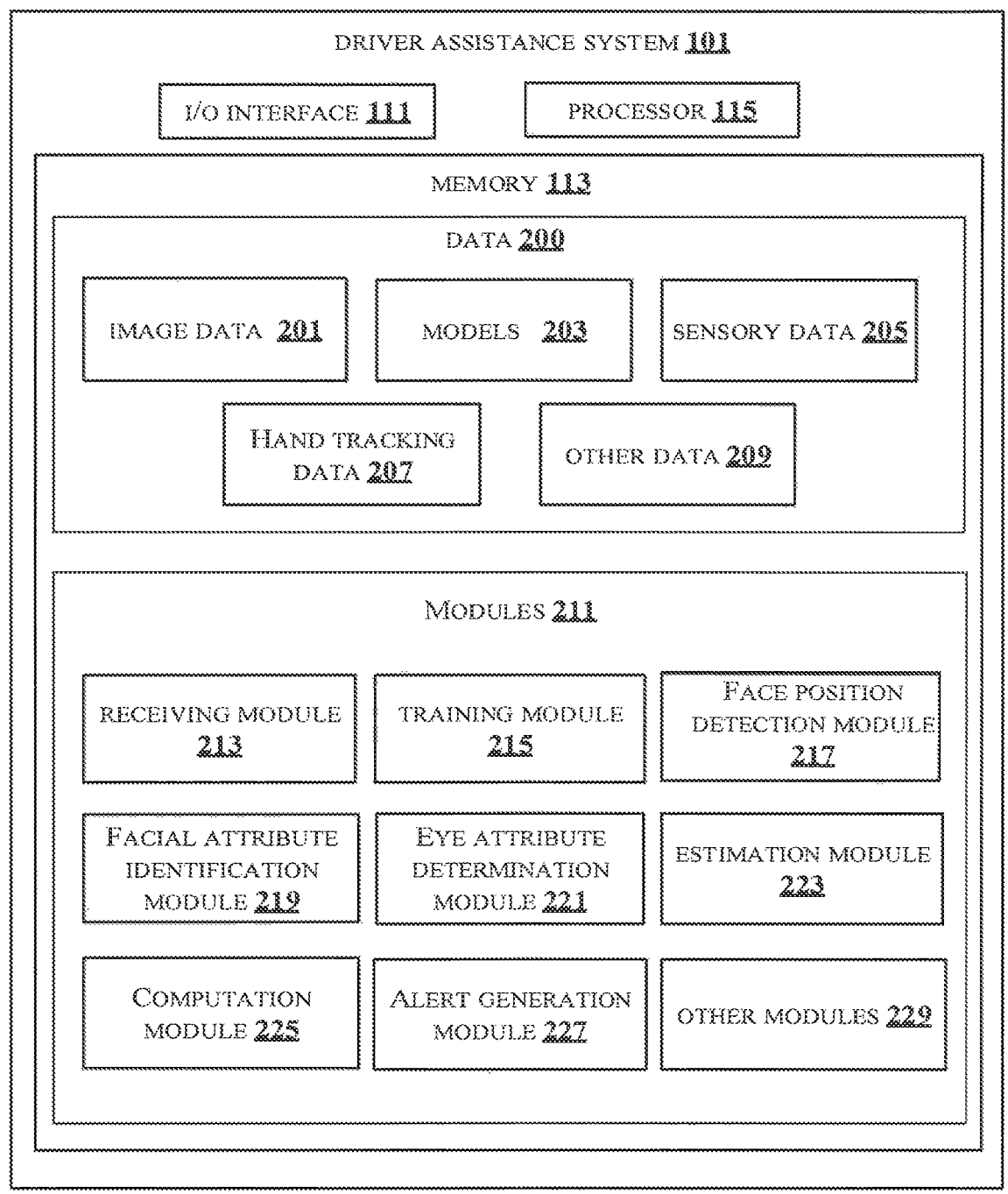
FIG. 2 shows a detailed block diagram of a driver assistance system in accordance with some embodiments of the present disclosure.

FIG. 2 shows a detailed block diagram of a driver assistance system in accordance with some embodiments of the present disclosure.

The driver assistance system 101 may include data 200 and one or more modules 211 which are described herein in detail. In an embodiment, data 200 may be stored within the memory 113. The data 200 may include, for example, image data 201, models 203, sensory data 205, hand tracking data 207 and other data 209.

The image data 201 may include the images or video stream of the driver in the vehicle 102 received from the image capturing device 103. In an embodiment, the images may be extracted from the video stream by any known techniques. For instance, the images may be stored sequentially as shown in equation 1 below:

$$I = IR_1, IR_2, IR_3, \ldots, IR_n \qquad (1)$$

Where $IR_n$'s is ordered sequence of images for each i=1, 2, . . . n

Alternatively, the image data 201 may also include the plurality of frames extracted from the images or video stream.

The models 203 may include the position detection model, the feature extraction model, the attribute determination model and the event model. The position detection model, the feature extraction model, the attribute determination model and the event model are neural network models trained using deep learning techniques.

The sensory data 205 may include the plurality of labels indicating presence or absence of one or more threats to the vehicle 102. In an embodiment, each label may include types of haptic sensation depending on the threat. For example, driver drowsiness is a threat which is caused by driver closing the eyes and blinking the eyes. Hence, the sensory data may include a label as driver closing the eyes and may include associated haptic sensation for alerting the driver. Likewise, the labels may be, blinking the eyes, looking up, looking down, looking left and looking right and the like.

The hand tracking data 207 may include details regarding position of the hands of the driver in the vehicle 102.

The other data 209 may store data, including temporary data and temporary files, generated by modules 211 for performing the various functions of the driver assistance system 101.

In an embodiment, the data 200 in the memory 113 are processed by the one or more modules 211 present within the memory 113 of the driver assistance system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the driver assistance system 101. The said modules 211 when configured with the functionality defined in the present disclosure will result in a novel hardware.

In one implementation, the one or more modules 211 may include, but are not limited to a receiving module 213, a training module 215, a face position detection module 217, a facial attribute identification module 219, an eye attribute determination module 221, estimation module 223, computation module 225 and an alert generation module 227. The one or more modules 211 may also include other modules 229 to perform various miscellaneous functionalities of the driver assistance system 101. In an embodiment, the other modules 229 may include frame identification module for identifying the plurality of frames from the images/video stream provided by the image capturing device 103.

The receiving module 213 may receive the plurality of frames of the driver from the image capturing device 103. Further, the receiving module 213 may receive the position of the hands of the driver from the hand tracking device 105.

The training module 215 may train the models 203 based on the training images of the driver. In an embodiment, the training may be performed offline. In an embodiment, the training may be performed external to the driver assistance system 101. The training module 215 may train the models 203 using machine learning techniques. The position detection model is trained using the training images of driver annotated with position of face in each image. The feature extraction model is trained using the training images annotated with facial attributes such as orientation, geometrical features associated with face, face positions and the like. In an embodiment, the facial attributes may be learnt and trained for the sequence of frames to understand the context of the scenario. In an embodiment, the training module 215 may identify a threshold value for comparing the aspects associated with the driver.

For example, if a driver is looking back and talking to the passenger in the back seat. In such cases, the features of looking back by driver is checked in subsequent frames with the threshold value. Thus, if the number of frames in which the driver is looking back is more than the threshold value, the context may be drawn that the driver is distracted. For instance, the threshold value may be nine and the number of frames in which the driver is looking back is ten. In such case, the context is identified that the driver is distracted. For example, consider equation 2.

$$F=(F_1,F_2,F_3,\ldots,F_n) \quad (2)$$

where $F_i$'s is ordered sequence of facial attributes for each i=1, 2, . . . n obtained from sequence of frames.

Here, for each frame contains multiple attributes which are given below $F_1=(F_{11}, F_{12}, F_{13}, \ldots, F_{1m})$: $F_{1j}$—is the $j^{th}$ facial attributes extracted from $1^{st}$ frame for each j=1, 2, . . . , m $F_2=(F_{21}, F_{22}, F_{23}, \ldots, F_{2m})$: $F_{2j}$—is the $j^{th}$ facial attributes extracted from $2^{nd}$ frame for each j=1, 2, . . . , m $F_n=(F_{n1}, F_{n2}, F_{n3}, \ldots, F_{nm})$: $F_{nj}$—is the $j^{th}$ facial attributes extracted from $n^{th}$ frame for each j=1, 2, . . . , m.

Further, the attribute determination model is trained using the training images annotated with eye attributes. In an embodiment, the eye attributes may be learnt and trained for the sequence of frames to understand the context of the scenario. In an embodiment, the training module 215 may identify a threshold value for comparing the aspects associated with the driver. For example, if a driver is sleeping while driving. In such cases, the aspect of closed eyes is checked in subsequent frames for a predefined threshold number of frames. Thus, if the number of frames in which the driver is sleeping is more than the threshold value, the context may be drawn that the driver is sleepy or drowsy.

For example, consider below equation 3.

$$\text{Let } E=(E_1,E_2,E_3,\ldots,E_n) \quad (3)$$

Where $E_i$'s is ordered sequence of eye features for each i=1, 2, 3, . . . , n.

Here eye features may be extracted from each frame which contains more than one feature. For instance:

$E_1=(E_{11}, E_{12}, E_{13}, \ldots, E_{1m})$: $E_{1j}$—is the $j^{th}$ eye feature associated with $1^{st}$ frame for each j=1, 2, . . . , m.

$E_2=(E_{21}, E_{22}, E_{23}, \ldots, E_{2m})$: $E_{2j}$—is the $j^{th}$ eye feature associated with $2^{nd}$ frame for each j=1, 2, . . . , m.

$E_n=(E_{n1}, E_{n2}, E_{n3}, \ldots, E_{nm})$: $E_{nj}$—is the $j^{th}$ eye feature associated with $n^{th}$ frame for each j=1, 2, . . . , m.

Thus, based on the eye attributes in continuous sequence of frames, context of the situation may be determined. The context may be if the driver is sleepy/drowsy while driving the vehicle 102.

Further, the event model may be trained by the training module 215 by using the facial attributes (F) and eye attributes (E) along with sensory data as labels. The labels indicate the presence or absence of threat to the driver. The labels may be for example, driver drowsiness, driver sleeping, driver distraction such as driver is looking up, down, left and right. In an embodiment, the facial attributes and the eye attributes may be sequential.

For instance:

Let Facial attributes be $F=(F_1, F_2, F_3, \ldots, F)$, where $F_i$'s are ordered sequence of facial attributes obtained from sequence of frames for each i=1, 2, 3, . . . n;

Let eye attributes be $E=(E_1, E_2, \ldots, E_n)$, where $E_i$'s are ordered sequence of eye attributes obtained from sequence of frames for each $i=1, 2, 3, \ldots n$;
In such case, the sensory data for training may be:
$D=(D_1, D_2, D_3, \ldots, D_n)$, where $D_i=\{F_i, E_i\}$ are ordered sequence of data for each $i=1, 2, 3, \ldots n$.
The labels in the sensory data may be labelled as $\{L_1, L_2, L_3, \ldots, L_n\}$.

The face position detection module 217 may detect the position of the face of the driver in the vehicle 102 in each of the plurality of frames obtained from the image capturing device 103 by using the position detection model. Thus, the face position detection module 217 may locate position of the face of the driver in the plurality of images.

The facial attribute identification module 219 may identify the one or more facial attributes of the driver based on the position of the face by using the feature extraction model. The one or more facial attributes may include for example, geometrical features associated with face, face positions and orientations such as face towards left, right or up or down. In an embodiment, the facial attribute identification module 219 may identify the facial attributes in the sequence of frames to understand the context of scene. For example, if the driver is looking back and talking to the passenger in the back seat. In such case, the facial attributes of the driver looking back is verified in subsequent frames and compared with the threshold value. If occurrence of the facial attribute of looking back is greater than the threshold value, the context may be drawn that the driver is distracted.

The eye attribute determination module 221 may determine the one or more eye attributes of the driver based on the identified one or more facial attributes by using the attribute determination model. In an embodiment, the eye attributes may include number of times the driver closes and opens eyes in the predetermined time period, closed and opened eyelids and dilated and contracted pupil size of the driver. The eye attribute determination module 221 may detect number of times the eyes of the driver are closed or opened in a sequence of the plurality of frames and compare the number with the threshold value to identify whether the driver is sleepy or drowsy while driving the vehicle 102.

The estimation module 223 may estimate the sensory information from the sensory data based on the one or more facial attributes and the one or more eye attributes by using the event model. For example, consider the driver is sleeping and the one or more facial attributes and eye attributes are provided to the event model. In such case, the event model may provide the sensory information say for example, L1 indicating a threat since the driver is sleeping and include haptic sensation for alerting the driver. Thus, the event model may map the facial attributes and eye attributes provided in real-time with the facial attributes and eye attributes associated with the stored sensory data to estimate the sensory information.

The computation module 225 may compute the information regarding the haptic sensation. The computation module 225 computes the information based on the estimated sensory information and the position of hands of the driver received from the hand tracking device 105. The information regarding the haptic sensation include position where the haptic sensation is to be experienced by the driver. For example, let $L_1$ be the identified sensory information and "P" be position of hands. In such case, the computation module 225 may compute the information as represented by equation 4.

$$E=F(P,L_1) \qquad (4)$$

Where, function F may calculate the location of the predicted sensory information relative to position of hands.

Figure 3A:
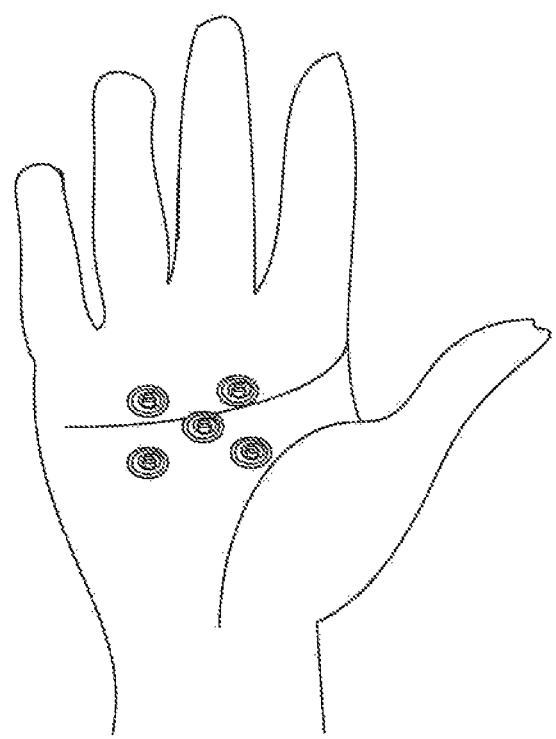
FIG. 3a and FIG. 3b show exemplary representations of types of haptic sensation in accordance with some embodiments of the present disclosure.
Figure 3B:
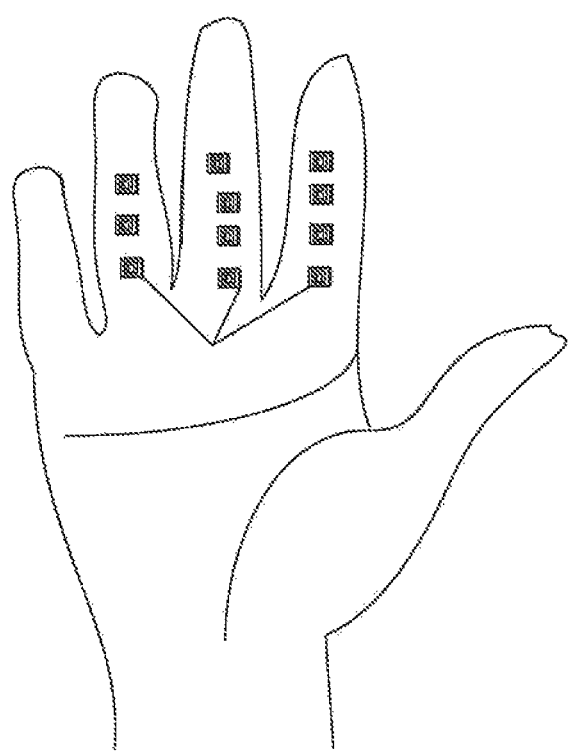

The alert generation module 227 may generate alert to the driver by using the signals generated by the haptic device 107 based on the computed information regarding the haptic sensation or alert received from the computation module 225. The alert generation module 227 may indicate the haptic device 107 regarding the type of haptic alert to be provided to the driver. For example, the haptic alert may be sensation on the hands in form of circles, dots, square and the like corresponding to type of threat such as, driver sleeping, driver drowsiness, driver distraction, driver turning left or right etc. FIG. 3*a* and FIG. 3*b* show exemplary representations of types of haptic sensation in accordance with some embodiments of the present disclosure. As shown in FIG. 3*a*, the haptic alert is provided on palms in form of circles. Likewise, in FIG. 3*b*, the haptic alerts are provided to the hands at the fingers in form of squares.

Figure 4A:
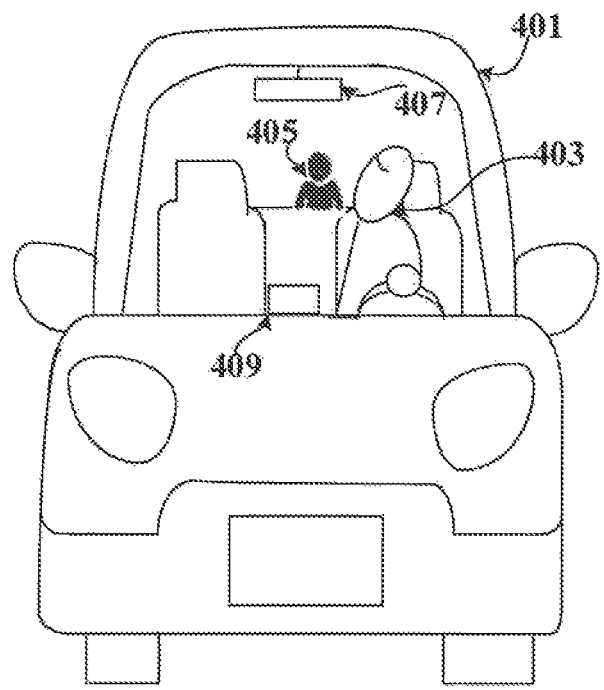
FIG. 4a and FIG. 4b illustrate exemplary representations for generating touch-based alerts to a driver in accordance with some embodiments of the present disclosure.
Figure 4B:
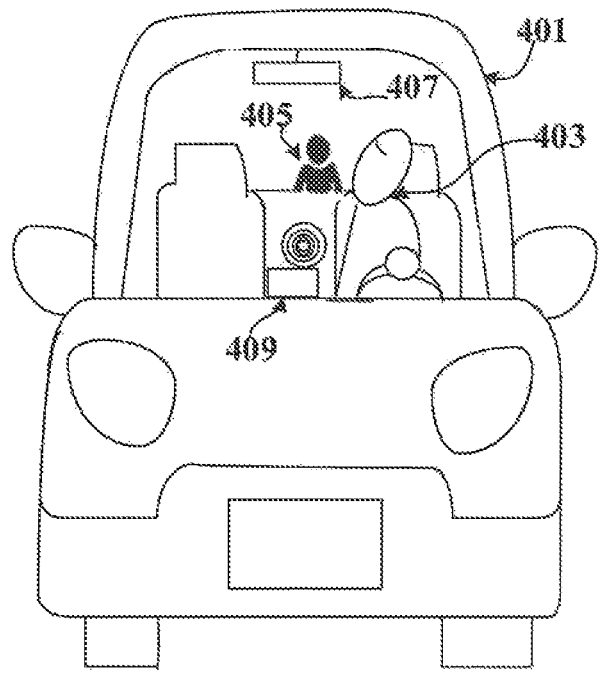

FIG. 4*a* and FIG. 4*b* illustrate exemplary representations for generating touch-based alerts to a driver in accordance with some embodiments of the present disclosure.

Referring to FIG. 4*a*, an exemplary representation 400 for generating touch-based alerts is illustrated. The exemplary representation 400 includes a car 401, a driver 403 driving the car 401 and a co-passenger 405 sitting in back seat of the car 401. The car 401 is configured with a camera 407, a haptic device 409 such as mid-air haptic device and a hand tracking device such as a leap motion camera (not shown explicitly). Consider a situation where the driver 403 driving the car 401 is turning and talking with the co-passenger 405 as shown in FIG. 4*a*. The car 401 comprises the driver assistance system 101 (not shown explicitly in FIG. 4*a*). In an embodiment, the driver assistance system 101 may be configured to generate alerts. In present situation, the driver assistance system 101 may receive the plurality of frames of the driver 403 from the camera 407.

For instance, consider the driver assistance system 101 receives five frames of the driver 403. The driver assistance system 101 may process the five frames to identify the position of face of the driver 403, the one or more facial attributes of the driver 403 based on the position of the face and one or more eye attributes of the driver 403. In an embodiment, the one or more facial attributes may include geometrical features associated with face, face positions and the orientations. The one or more eye attributes may be number of times the driver 403 closes and opens eyes in the predetermined time period, closed and opened eyelids and dilated and contracted pupil size of the driver 403. For instance, the predetermined time period may be one minute. Consider, the eyes of the driver 403 are identified to be open in the predetermined time period of one minute. In present scenario, the orientation of the face of the driver 403 is identified to be titled towards left and the one or more eye attributes is identified to be open. Thus, based on the one or more facial attributes and the eye attributes, the driver assistance system 101 estimates the sensory information. For example, the sensory information is identified to be with a label "L2", indicating a threat as the driver 403 is titling towards back seat based on the information of the one or more facial attributes and eye attributes.

Further, the sensory information "L2" indicates the haptic sensation associated with the threat to be in form of circles. Thereafter, the driver assistance system 101 may request for the position of the hands of the driver 403 from the hand tracking device. Thus, based on the sensory information and the position of the hands, the driver assistance system 101 may compute the information regarding haptic sensation.

The information may include position of the hands of the driver 403, where the haptic sensation may be provided. Therefore, using the information regarding haptic sensation, the driver assistance system 101 may generate the alert to the driver 403. The alert may be generated based on signals generated by the haptic device 409 on the hands of the driver 403 as shown in FIG. 4b. In an embodiment, the haptic sensation may of different types or intensity depending on severity of the threat. In the present scenario, the driver assistance system 101 may generate haptic sensation in form of circles on palm of the driver 403. In an embodiment, the driver 403 may be pretrained with different types of haptic sensation and the threat associated with them. Thus, based on the haptic sensation, the driver 403 may take corrective action and turn towards the road while driving the car 401.

Figure 5:
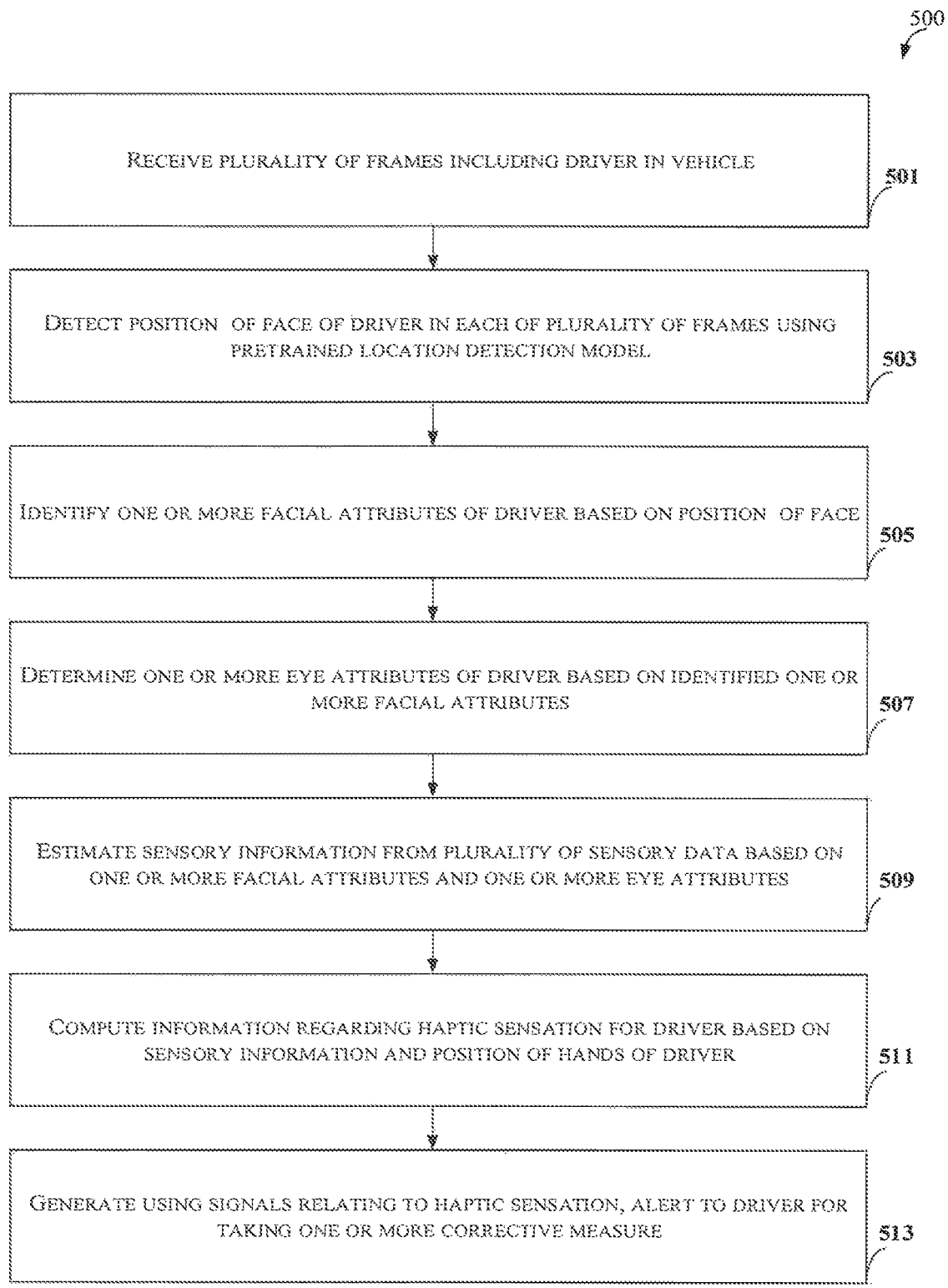
FIG. 5 illustrates a flowchart showing a method for generating touch-based alerts to a driver in accordance with some embodiments of present disclosure.

FIG. 5 illustrates a flowchart showing a method for generating touch-based alerts to a driver in accordance with some embodiments of present disclosure.

As illustrated in FIG. 5, the method 500 includes one or more blocks for generating touch-based alerts to a driver. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the plurality of frames including the driver in the vehicle 102 is received by the receiving module 213 from the image capturing device 103.

At block 503, the location of face of the driver is detected by the face location detection module 217 in each of the plurality of frames using the pretrained location detection model.

At block 505, the one or more facial attributes of the driver are identified by the facial attribute identification module 219 based on the location of the face using the pretrained feature extraction model.

At block 507, the one or more eye attributes of the driver are determined by the eye attribute determination module 221 based on the identified one or more facial attributes using the pretrained attribute determination model.

At block 509, the sensory information is estimated from the plurality of sensory data by the estimation module 223 based on the one or more facial attributes and the one or more eye attributes using the pretrained event model.

At block 511, the information regarding the haptic sensation is computed for the driver by the computation module 225 based on the estimated sensory information and the position of hands of the driver received from the hand tracking device 105.

At block 513, the alert is generated to the driver by the alert generation module 227 using signals relating to the haptic sensation received from the haptic device 107 for taking one or more corrective measure.

Advantages of the Present Disclosure:

An embodiment of the present disclosure provides touch-based alert to the driver in real time. Since the system is touch based alert system, other co-passengers may not get disturbed due to alerts to the driver.

An embodiment of the present disclosure eliminates distraction to the driver by any visual warnings. The present disclosure may send a touch-based alert to the driver which is experience/felt by the driver unlike any audio/video/bright intensity images which may distract the driver from the road.

An embodiment of the present disclosure generates the haptic sensation based on position of hands and facial and eye attributes of the driver. The present disclosure minimises computation for generating the haptic sensation since distraction of the driver is identified based on the sensory information associated with facial and eye attributes. Thus, the present disclosure eliminates a need for high-power machines for computations. In addition, the present disclosure requires minimum data training for providing alerts to driver since the alerts/touch sensation are directly provided to the driver based on driver facial/eye features.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article or a system is described herein, it will be readily apparent that more than one devices/articles/systems (whether or not they cooperate) may be used in place of a single device/article. Similarly, where more than one device or article is described herein (whether or not they cooperate), it will be readily apparent that a single device/article/system may be used in place of the more than one device or article or a different number of devices/articles may be used instead of the shown number of devices or programs. For example, in some embodiments the driver assistance system may include image capturing device, a hand tracking device and a haptic device. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 101 | Driver assistance system |
| 102 | Vehicle |
| 103 | Image capturing device |
| 105 | Hand tracking device |
| 107 | Haptic device |
| 109 | Database |
| 111 | I/O interface |

-continued

| Reference Number | Description |
| --- | --- |
| 113 | Memory |
| 115 | Processor |
| 200 | Data |
| 201 | Image data |
| 203 | Models |
| 205 | Sensory data |
| 207 | Hand tracking data |
| 209 | Other data |
| 211 | Modules |
| 213 | Receiving module |
| 215 | Training module |
| 217 | Face location detection module |
| 219 | Facial attribute identification module |
| 221 | Eye attribute determination module |
| 223 | Estimation module |
| 225 | Computation module |
| 227 | Alert generation module |
| 229 | Other modules |
| 401 | Car |
| 403 | Driver |
| 405 | Co-passenger |
| 407 | Camera |
| 409 | Haptic device |

What is claimed is:

1. A method for generating touch-based alerts to a driver in a vehicle, the method comprising:

receiving, by a driver assistance system, a plurality of frames including the driver in the vehicle from an image capturing device configured in the vehicle;

detecting, by the driver assistance system, a position of face of the driver in each of the plurality of frames using a pretrained position detection model;

identifying, by the driver assistance system, one or more facial attributes of the driver based on the position of the face using a pretrained feature extraction model;

determining, by the driver assistance system, one or more eye attributes of the driver based on the identified one or more facial attributes using a pretrained attribute determination model;

estimating, by the driver assistance system, sensory information from a plurality of sensory data based on the one or more facial attributes and the one or more eye attributes using a pretrained event model;

computing, by the driver assistance system, information regarding haptic sensation for the driver based on the estimated sensory information and a position of hands of the driver received from a hand tracking device configured in the vehicle; and generating, using signals relating to the haptic sensation received from a haptic device, by the driver assistance system, an alert to the driver for taking one or more corrective measure, wherein the haptic device generates the signals based on the computed information regarding the haptic sensation.

2. The method as claimed in claim 1, wherein the position detection model is trained using a plurality of training frames of the driver.

3. The method as claimed in claim 1, wherein the one or more facial attributes comprise, geometrical features associated with face, face positions and orientations and the one or more eye attributes comprises number of times the driver closes and opens eyes in a predetermined time period, closed and opened eyelids and dilated and contracted pupil size of the driver.

4. The method as claimed in claim 1, wherein determining the one or more eye attributes comprises detecting number of times eyes of the driver are closed or opened in a sequence of the plurality of frames, and comparing with a threshold value to identify whether the driver is sleepy or drowsy while driving the vehicle.

5. The method as claimed in claim 1, wherein estimating the sensory information comprises detecting a threat to the driver based on the one or more facial attributes and the one or more eye attributes.

6. The method as claimed in claim 5 wherein the sensory information comprises one or more types of haptic sensation for the driver based on severity of the threat detected.

7. A driver assistance system for generating touch-based alerts to a driver in a vehicle, wherein the driver assistance system is connected to an image capturing device, a hand tracking device and a haptic device configured in the vehicle, comprising:
   a processor; and
   a memory communicatively coupled to the processor, wherein the memory stores processor instructions, which, on execution, causes the processor to:
      receive a plurality of frames including the driver in the vehicle from the image capturing device;
      detect a position of face of the driver in each of the plurality of frames using a pretrained position detection model;
      identify one or more facial attributes of the driver based on the position of the face using a pretrained feature extraction model;
      determine one or more eye attributes of the driver based on the identified one or more facial attributes using a pretrained attribute determination model;
      estimate sensory information from a plurality of sensory data based on the one or more facial attributes and the one or more eye attributes using a pretrained event model;
      compute information regarding haptic sensation for the driver based on the estimated sensory information and a position of hands of the driver received from the hand tracking device; and
      generate using signals relating to the haptic sensation received from the haptic device, an alert to the driver for taking one or more corrective measure, wherein the haptic device generates the signals based on the computed information regarding the haptic sensation.

8. The driver assistance system as claimed in claim 7, wherein the processor trains the position detection model using a plurality of training frames of the driver.

9. The driver assistance system as claimed in claim 7, wherein the one or more facial attributes comprise, geometrical features associated with face, face positions and orientations and the one or more eye attributes comprises number of times the drive closes and opens eyes in a predetermined time period, closed and opened eyelids and dilated or contracted pupil size of the driver.

10. The driver assistance system as claimed in claim 7, wherein the processor determines the one or more eye attributes by detecting number of times eyes of the driver are closed or opened in a sequence of the plurality of frames, and comparing with a threshold value to identify whether the driver is sleepy or drowsy while driving the vehicle.

11. The driver assistance system as claimed in claim 7, wherein the processor estimates the sensory information by detecting a threat to the driver based on the one or more facial attributes and the one or more eye attributes.

12. The driver assistance system as claimed in claim 11, wherein the sensory information comprises one or more types of haptic sensation for the driver based on severity of the detected threat.

13. A non-transitory computer readable medium including instruction stored thereon that when processed by at least one processor cause an application deployment system to perform operation comprising:
   receiving a plurality of frames including the driver in the vehicle from an image capturing device configured in the vehicle;
   detecting a position of face of the driver in each of the plurality of frames using a pretrained position detection model;
   identifying one or more facial attributes of the driver based on the position of the face using a pretrained feature extraction model;
   determining one or more eye attributes of the driver based on the identified one or more facial attributes using a pretrained attribute determination model;
   estimating sensory information from a plurality of sensory data based on the one or more facial attributes and the one or more eye attributes using a pretrained event model;
   computing information regarding haptic sensation for the driver based on the estimated sensory information and a position of hands of the driver received from a hand tracking device configured in the vehicle; and
   generating, using signals relating to the haptic sensation received from a haptic device, an alert to the driver for taking one or more corrective measure, wherein the haptic device generates the signals based on the computed information regarding the haptic sensation.

14. The medium as claimed in claim 13, wherein the processor trains the position detection model using a plurality of training frames of the driver.

15. The medium as claimed in claim 13, wherein the one or more facial attributes comprise, geometrical features associated with face, face positions and orientations and the one or more eye attributes comprises number of times the drive closes and opens eyes in a predetermined time period, closed and opened eyelids and dilated or contracted pupil size of the driver.

16. The medium as claimed in claim 13, wherein the processor determines the one or more eye attributes by detecting number of times eyes of the driver are closed or opened in a sequence of the plurality of frames, and comparing with a threshold value to identify whether the driver is sleepy or drowsy while driving the vehicle.

17. The medium as claimed in claim 13, wherein the processor estimates the sensory information by detecting a threat to the driver based on the one or more facial attributes and the one or more eye attributes.

18. The medium as claimed in claim 17, wherein the sensory information comprises one or more types of haptic sensation for the driver based on severity of the detected threat.

* * * * *